United States Patent [19]

Morisawa

[11] Patent Number: 5,218,396
[45] Date of Patent: Jun. 8, 1993

[54] VIEW FINDER HAVING A LIGHT EMITTING DEVICE

[75] Inventor: Tahei Morisawa, Tokyo, Japan

[73] Assignee: Asahi Kogaku Kogyo Kabushiki Kaisha, Tokyo, Japan

[21] Appl. No.: 687,709

[22] Filed: Apr. 19, 1991

[30] Foreign Application Priority Data

Apr. 26, 1990 [JP] Japan ................................ 2-110765

[51] Int. Cl.$^5$ ........................ G03B 7/099; G03B 13/04
[52] U.S. Cl. .................................. 354/409; 354/471; 354/476; 354/219
[58] Field of Search ........................ 354/409, 476–483, 354/471–475, 466, 199–201, 219, 224, 225, 484

[56] References Cited

U.S. PATENT DOCUMENTS

| | | | |
|---|---|---|---|
| 3,590,682 | 7/1971 | Ort et al. | |
| 4,016,576 | 4/1977 | Nomura | 354/225 X |
| 4,101,916 | 7/1978 | Gottschalk | 354/219 |
| 4,367,463 | 1/1983 | Suzuki et al. | |
| 4,443,086 | 4/1984 | Hosoe et al. | 354/409 |
| 4,557,578 | 12/1985 | Seely | 354/409 X |
| 4,576,451 | 3/1986 | Tominaga | 350/566 |
| 4,595,272 | 6/1986 | Wilwerding | 354/409 |
| 4,672,782 | 6/1972 | Akin, Jr. | 356/251 |
| 4,681,420 | 7/1987 | Suda et al. | 354/409 |
| 4,949,118 | 8/1990 | Yamamoto et al. | 354/475 |

FOREIGN PATENT DOCUMENTS

| | | |
|---|---|---|
| 226514 | 3/1963 | Austria . |
| 3843078 | 7/1969 | Fed. Rep. of Germany . |
| 2921318 | 11/1979 | Fed. Rep. of Germany . |
| 3038389 | 4/1981 | Fed. Rep. of Germany . |
| 2952207 | 6/1981 | Fed. Rep. of Germany . |
| 3100473 | 12/1981 | Fed. Rep. of Germany . |
| 3211234 | 10/1982 | Fed. Rep. of Germany . |
| 3421214 | 12/1985 | Fed. Rep. of Germany . |
| 2084347 | 4/1982 | United Kingdom . |
| 2162654 | 2/1986 | United Kingdom . |

OTHER PUBLICATIONS

"Camera", 1968, No. 7, p. 46.
French Search Report and Annex.

*Primary Examiner*—W. B. Perkey
*Attorney, Agent, or Firm*—Sandler, Greenblum & Bernstein

[57] ABSTRACT

A view finder in which an image formed by an objective optical system is observed through an eyepiece optical system comprising a half mirror for deflecting a light path from the objective optical system toward the eyepiece optical system, which is located behind an image forming position of the objective optical system. A light emitting device is provided, which defines a bright indicating area in the field of view of the view finder when the light emitting device is energized. The light emitting device is disposed behind the half mirror as viewed from the eyepiece optical system side.

15 Claims, 5 Drawing Sheets

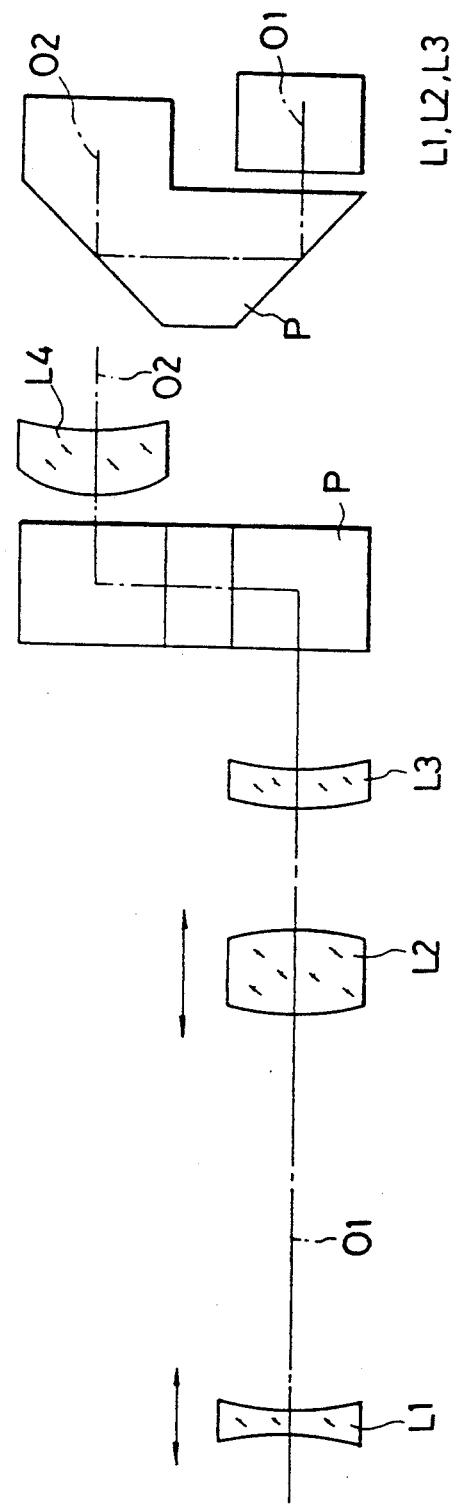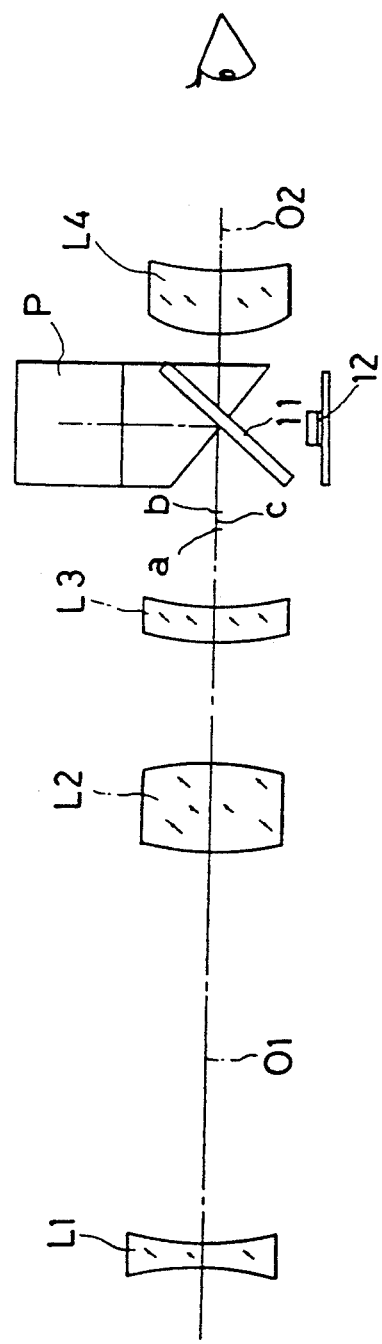

VIEW FINDER HAVING A LIGHT EMITTING DEVICE

BACKGROUND OF THE INVENTION

1. Field of the Invention

This invention relates to a view finder, more particularly to a view finder which is suitable to be used for a camera.

2. Description of the Related Art

A conventional view finder used for an auto-focus camera has an observation optical system and indicating frames. One of the indicating frames is a field frame used for indicating a photographing field of the camera. The other indicating frame is a distance measuring frame used to indicate a distance measuring zone measuring a distance of an object, by the distance measuring device provided in the camera.

The conventional view finder is arranged so that both the indicating frames and an image of the object seen through the view finder are superimposed so that the observer can clearly visualize them.

As for an inverted Galilean type alvada finder which is a well-known view finder, a transparent plate, forming reflection patterns corresponding to the indicating frames thereon, is disposed in front of an eyepiece lens, as viewed from the observation optical system side. The pattern is reflected by a luminous flux passed through the finder. Both the reflected pattern and the image of the object are observed through the eyepiece lens.

As for an inverted Galilean type finder of the light intake type, a pattern plate having transparent portions (or notch portions) corresponding to the indicating frames is illuminated by external light, the transparent light, which passed through the pattern plate, and the image of the object are superimposed by a half mirror, so that the observer can observe both the indicating frames and the image of the object.

On the other hand, in a real image type view finder, the transparent plate, having patterns corresponding to the indicating frames, is provided at a predetermined position which coincides with a position where the real image of the object, located at a specific distance, is formed by an objective optical system. Hence, the observer can observe both the indicating frames and the real image of the object formed on the transparent plate. However, the conventional view finder, as described above, has had several problems. The ability to easily see the indicating frames depends on the background view of the picture to be photographed and the brightness of the object, in other words, it is not easy for the observer to recognize the indicating frames when the photographing scope is dark. In addition, since the distance measuring frame is only a partial outline of the distance measuring zone, so as not to disturb his or her sight in the view finder, it is not easy to recognize the distance measuring frame in particular. Furthermore, an imaging position of the virtual image or the real image of the object, which is formed by the objective optical system, varies in the optical axis direction of the objective optical system, according to the objective distance of the object.

Therefore, when the observer observes the image of the object, the observer will unconsciously adjust the focus of his or her eye corresponding to the variation of the imaging position. Hence, the observer can clearly see both the image of the object and the indicating frames when the imaging position substantially coincides with the predetermined position at which the plate is disposed. Although in most cases, namely, when it does not coincide with the predetermined position, the observer is forced to alternate the focus of his or her eye. This causes fatigue in the observer's eye.

SUMMARY OF THE INVENTION

Therefore, it is an object of the present invention to eliminate these disadvantages of the conventional view finder as mentioned above by providing a view finder whereby an observer can clearly recognize a distance measuring zone, for example, which is free from the influence of photographing conditions.

Another object of the present invention is to provide a view finder whereby an observer can clearly confirm a distance measuring zone even if the objective distance of the object, to be viewed, varies.

To achieve these objects mentioned above, the present invention has been done in accordance with a conception that provides an indicating area which is brighter than the surroundings instead of the distance measuring frame which is considered the essential element in the prior art.

According to one aspect of the present invention, there is provided a view finder having an objective optical system and an eyepiece optical system comprising: a beam splitter for reflecting optical flux from the objective optical system toward the eyepiece optical system, which is disposed behind an imaging position of an image formed by the objective optical system; and a light emitting means which defines a bright area at a predetermined position in the field of view of the view finder, which is disposed behind the beam splitter as viewed from the eyepiece lens side. Hence, the distance measuring zone is indicated as the bright area in the field of the view finder so that the observer can easily see it.

Preferably the light emitting means comprises a light emitting device and, a mask member disposed on the light emitting device. The size of indicating zone can be restricted by a light emitting window provided on the mask member. The thickness of the light emitting window (the thickness of the mask) is preferably designed thicker than the range of the imaging position which varies corresponding to the distance of the object. The thickness is designed as described above, the outline of the bright area can always be obtained clearly even if the objective distance of the object to be observed varies. Although it is possible that the window can be covered by a transparent plate or a diffusion plate, there is a problem that dust stuck on the plate might also obstruct the view. Thus, the plate described above is preferably provided on the light emitting device.

According to another aspect of the present invention, the light emitting means emits light when a power supply switch of the camera is turned on and blinks when the distance measuring device detects that the object is located outside of the distance capable to be photographed (the object is located at the place too near the camera for photographing, for example). Hence, both the indicating of the distance measuring zone and the warning that the photograph should not be taken are performed by using only one light emitting device.

The present disclosure relates to subject matter contained in Japanese patent application No. 2-110765 (filed on Apr. 26, 1990) which is expressly incorporated herein by reference in its entirety.

BRIEF DESCRIPTION OF THE DRAWINGS

FIG. 4A, FIG. 4B and FIG. 4C show a plan view, an elevation view and a side view of the view finder according to an embodiment of the present invention respectively;

DESCRIPTION OF THE PREFERRED EMBODIMENTS

Figure 1:
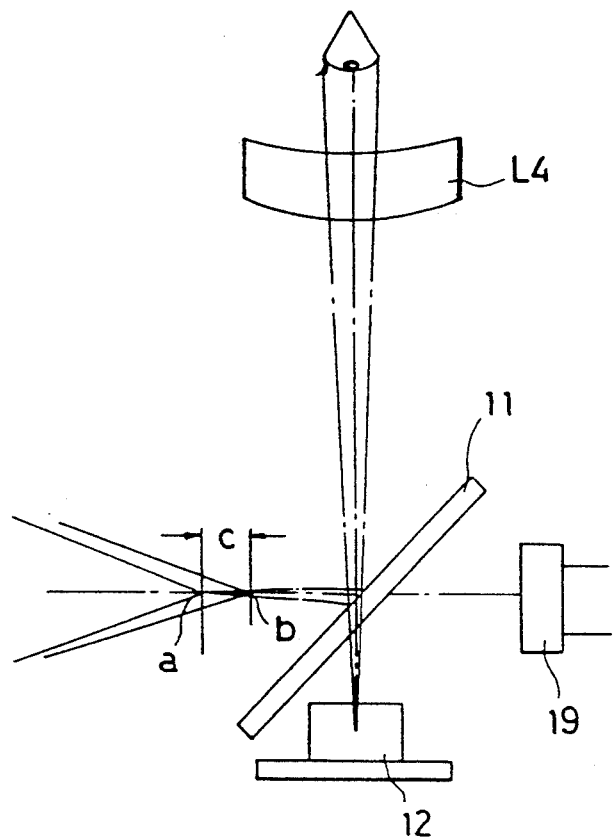
FIG. 1 shows a schematic optical construction of the main part of the real image type view finder according to the embodiment in the present invention.

The embodiments will be described with reference to the drawings hereinafter. FIG. 4A, FIG. 4B and FIG. 4C show a schematic optical construction of the real image type zoom view finder, according to an embodiment of the present invention.

An objective optical system is comprised of movable variator lenses L1, L2 and a fixed lens L3, which are disposed along the optical axis 01. A real image of an object is formed by the objective optical system within the image forming range "c" corresponding to an objective distance of the object. Here, the imaging position at which an object is located at infinity is defined as "a". The imaging position at which the object is located at the closest possible distance to be photographed is defined as "b". The image forming range "c" is defined as the distance between positions "a" and "b".

A half mirror 11, used as a beam splitter is located behind the image forming range to deflect the light path toward a Porro prism P and an eyepiece lens L4 with regard to the eyepiece optical system, which is disposed along an optical axis 02. An aerial image of the object formed within the range "c" by the objective optical system is observed as an erect image through the Porro prism P and the eyepiece lens L4. The aerial image is inverted vertically and horizontally by the Porro prism P to obtain an erect image.

A light emitting member 12 is located behind the half mirror 11, as viewed from the eyepiece lens side, to form the bright area 18 in a field of view 17 of the view finder. This arrangement is one of the main features of the present invention. The light emitting member 12 is located at the position which is optically equal to the image forming position.

Figure 2:
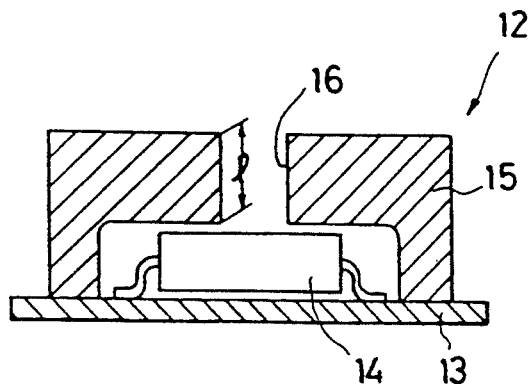
FIG. 2 shows a sectional view of the light emitting device in FIG. 1.
Figure 3:
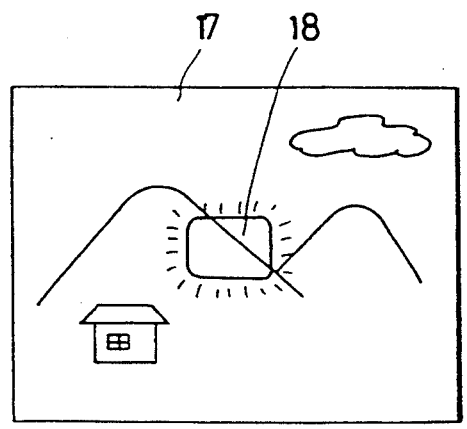
FIG. 3 shows a plan view of the field of the view finder to explain an example of the bright portion.

FIG. 1 and FIG. 2 show the circumference of the light emitting member 12 in detail. Here, the Porro prism P is omitted for simplification in FIG. 1. The light emitting member 12 comprises a light emitting device 14, fixed on a substrate 13, and a mask member 15 which covers the light emitting device 14. The mask member 15 has a light emitting window 16 which determines the position and size of the bright area 18 in the field of view 17. The position and thickness "l" of the light emitting window 16, in the optical axis direction, correspond to the image forming position and the image forming range "c" respectively. The thickness "l" of the light emitting window 16 is preferably longer than the image forming range "c". In this arrangement, dust stuck on the light emitting window 16 does not disturb the observer's view. The position of the light emitting window 16 is designed such that the bright area 18 appears at the center of the field of view 17 as a distance measuring zone of a distance measuring device 23, when the light emitting device 14 is activated as shown in FIG. 3. The distance measuring device measures the distance of the object which is positioned within the distance measuring zone.

In the view finder constructed as described above, the real image formed by the objective optical system including the movable variator lenses L1, L2 and a fixed lens L3, within the image forming range "c", is reflected toward the Porro prism P by the half mirror 11, and observed through the eyepiece lens L4. When the light emitting device 14 emits the light, the light passes through the half mirror 11, the Porro prism P and the eyepiece lens L4, thus the light is also simultaneously observed by the observer. Since the illumination size of the light from the light emitting device 14 is restricted by the light emitting window 16, so as to define the light portion 18 in a field of view 17 of the view finder, the observer can easily see the distance measuring zone by the bright portion 18 which is brighter than the surroundings. In addition, since there is no plate for indicating the distance measuring zone which is considered the essential element in the prior art, dust stuck on the plate, that is observed by the observer, is not a problem. Furthermore, wherever the image of the object is formed within the image forming range "c", the edge portion of the light emitting window 16 correspondingly exists at a position which is optically equivalent to the position of the image of the object as viewed from the side of the light emitting member 12. Therefore, when the observer focuses his or her eye onto the image of the object, located a certain distance away, through the eyepiece lens L4, the observer can see a clear outline of the bright area 18. Here, since it is possible to indicate the distance measuring zone even if the outline of the bright area 18 is not so clear, the fundamental effects, with the bright area 18 being clearly observed by the observer in the present invention, can be obtained even if the thickness "l" of the light emitting window 16 is decreased. Also due to this reason, the light emitting member 12 could be located in close proximity to the position which optically conjugates with the image forming range "c".

Figure 5:
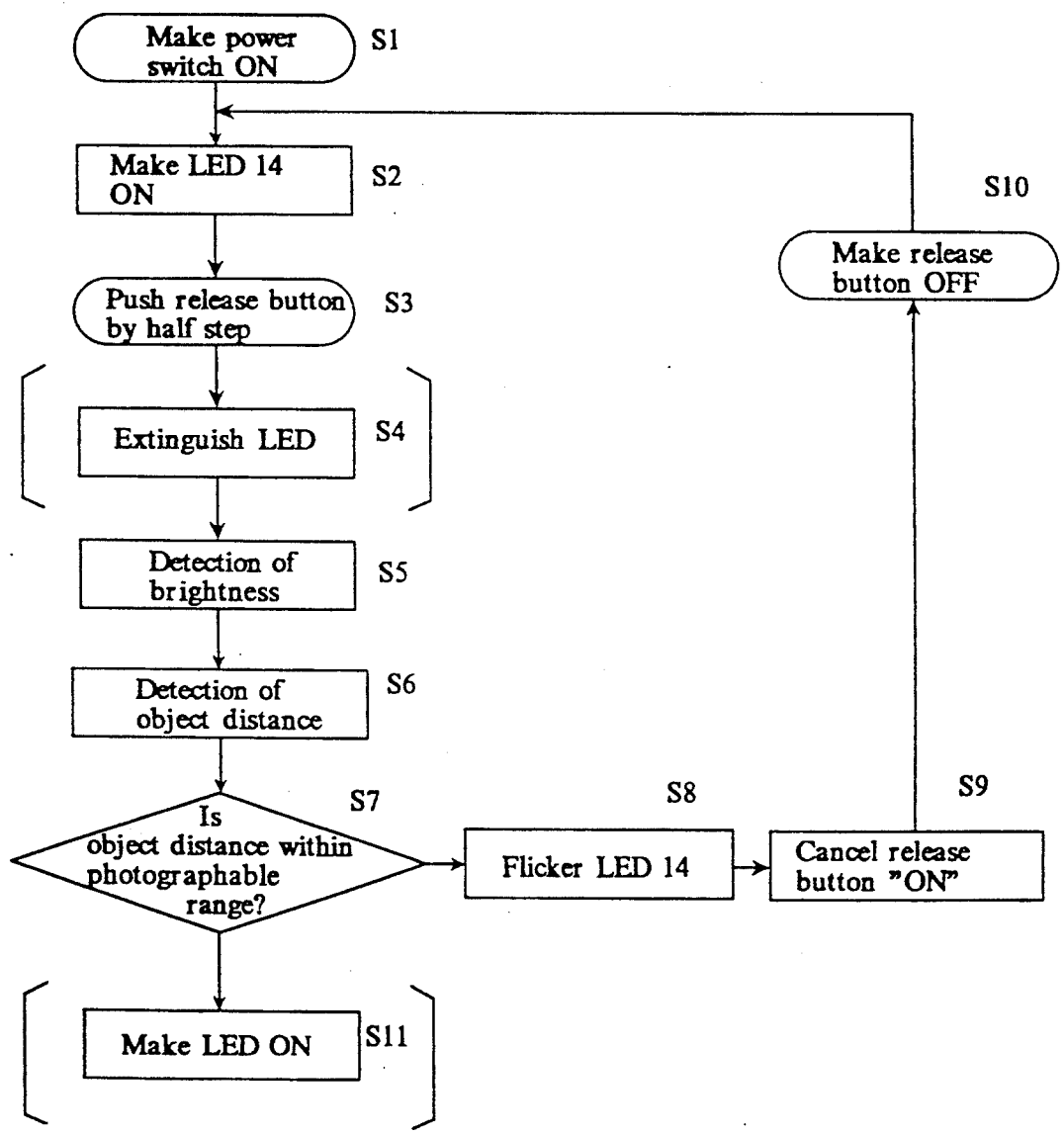
FIG. 5 shows a flowchart of an operation of a camera with the view finder in the present invention.
Figure 6:
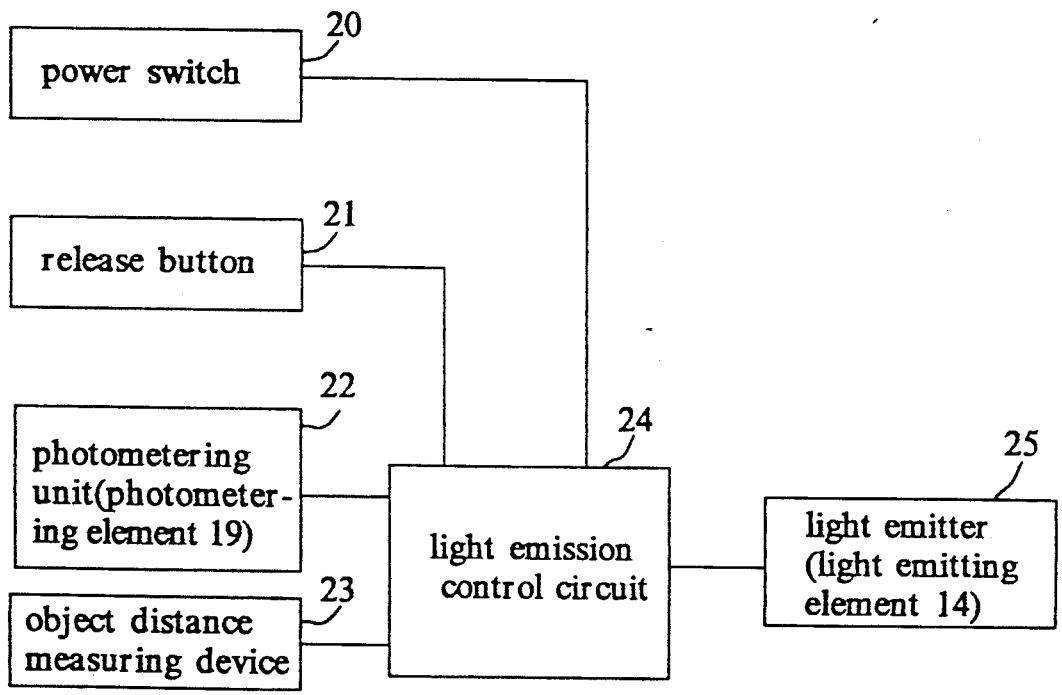
FIG. 6 shows a block diagram of the light emitting control circuit for controlling the light emitting device as shown in FIG. 2.

In the embodiment, as shown in FIG. 1, a photometer device 19 is disposed behind the half mirror 11, which is on an extension line of the optical axis 01. FIG. 5 shows a flow chart for controlling an emitting operation of the light emitting member 12 (the light emitting device 14) when the photometer device 19 is disposed as mentioned above in FIG. 1. The light emission of the light emitting member 12 is controlled by a light emission control circuit 24 which receives various signals from a power supply switch 20 of the camera, a release switch (button) 21, a photometering unit 22 (including the photometer device 19), and the distance measuring device 23 as shown in FIG. 6. The flow chart illustrated in FIG. 5 has the features such that the emission of the light emitting device 14 is inhibited while the photometering operation is in process. The emission blinks when the distance measuring device 23 of the camera outputs the warning indicating inadequate photographing conditions.

When the power supply switch is turned on, the light emission control circuit 24 activates the light emitting device 14 to emit the light, and the bright area 18 appears in the field of view 17 (steps S1 and S2). The observer looks at the object through the view finder, decides the framing of the object, and pushes the release button 21 in the first step (step S3). At this time, the light emitting control circuit 24 extinguishes the light emitting device 14 to prevent the light of the light emitting device 14 from entering the photometer device 19 (step S4). Then, the photometering and distance measuring of the object are performed by the photometer device 19 (the photometering unit 22) and the distance measuring device 23, respectively (step S5 and step S6).

When it is detected that the result of distance measuring by the distance measuring device 23 is inadequte to photograph (in other words, when the distance measuring device 23 detects that the distance of the object is too close to the camera for photographing), the light emitting device 12 blinks to warn the observer (steps S7 and S8) and returns to step S2 after the release button is released (steps S9 and S10).

On the other hand, when it is detected that the result of distance measuring is within the range of distance capable to be photographed (step S7), the light emitting device 14 is activated to emit the light and the bright area 18 appears again in the field of view 17 (step S11). After that, a shutter (not shown) is released in full step if the observer pushes the release button 21.

Since the flowchart illustrated in FIG. 5, as described above, is suitable for the case in which the photometer device 19 is disposed behind the half mirror 11, the step S9 could be omitted in the absence of the photometer device 19. Thus, the step S11 also could be omitted.

Figure 7:
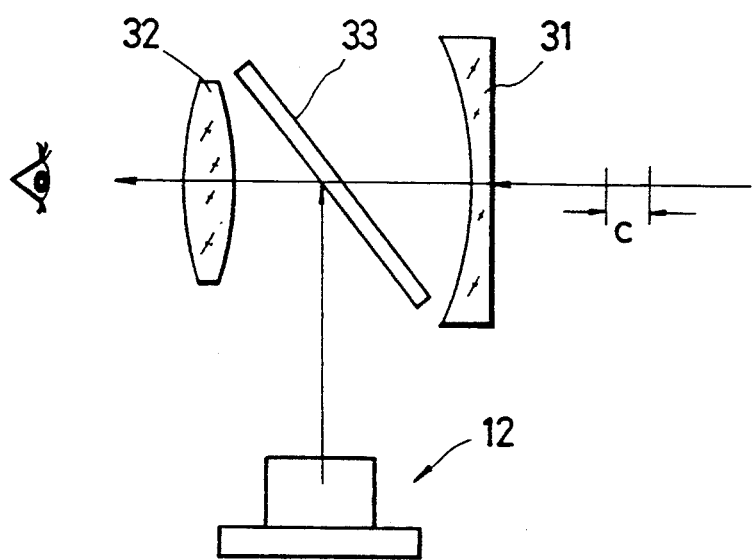
FIG. 7 shows a schematic optical construction of an inverted Galilean type alvada finder according to another embodiment of the present invention.

FIG. 7 shows another embodiment of the present invention which is applied to an inverted Galilean type finder. The inverted Galilean type finder, as is well-known, is comprised of an objective optical system 31 having a negative power and an eyepiece optical system 32 having a positive power. The observer observes the image of the object (the virtual image) formed by the objective optical system 31 through the eyepiece optical system 32. The image forming range "c" indicates the range of the virtual image formed by the optical system 31. A half mirror 33 is disposed between the objective optical system 31 and the eyepiece optical system 32, namely, behind the image forming range "c". A light emitting member 12 is located behind the half mirror 33 as viewed from the eyepiece optical system side. The position, at which the light emitting member 12 is located, is optically equivalent to the imaging position as in the first embodiment and the structure of the light emitting member 12 is also the same.

In this embodiment, the operation and the effect, which are similar to the first embodiment applied to the real image type view finder, can be obtained. Furthermore, since there is no transparent plate or pattern plate on which the patterns corresponding to the distance measuring zone are provided, the problem that occurs in the prior art devices, where dust stuck on the plate might be observed is avoided by the observer.

Although the embodiments of the present invention have been described with reference to the accompanying drawings, many modifications may be made by those skilled in this art without departing from the scope of the claims.

I claim:

1. A view finder in which an image formed by an objective optical system is observed through an eyepiece optical system comprising:
    a beam splitter for deflecting a light path from said objective optical system toward said eyepiece optical system, said beam splitter being located behind an image forming position of said objective optical system; and
    a light emitting means which defines a bright indicating area in a field of view of said view finder when said light emitting means emits light, which is disposed behind said beam splitter as viewed from said eyepiece optical system side,
    wherein said light emitting means comprises a light emitting device and a mask member disposed on said light emitting device,
    said mask member having a window to restrict a range of said bright indicating area, the thickness of said mask member being designed in accordance with an image forming range in which the image of an object is formed by said objective optical system.

2. A view finder according to claim 1, further comprising a photometering means for measuring the brightness of the object, which is disposed behind said beam splitter as viewed from said objective optical system side.

3. A view finder according to claim 1, further comprising a distance measuring means for measuring a distance of the object, wherein said bright area indicates a distance measuring zone.

4. A view finder according to claim 1, wherein said beam splitter is composed of a half mirror.

5. A view finder according to claim 1, wherein said light emitting means is located at a position optically equal to said image forming position.

6. A view finder according to claim 1, wherein said view finder is a real image view finder, said view finder including an objective optical system and an eyepiece optical system.

7. A camera including a view finder in which an observer observes an object, and a photometering means for photometering the brightness of an object comprising:
    indicating means which defines a bright area in the field of view of said view finder;
    a control means for controlling said indicating means for extinguishing said bright area while said photometering means is operating; and
    wherein said view finder further comprises an objective optical system and an eyepiece optical system; and
    said indicating means further comprises a beam splitter which is disposed between said objective optical system and said eyepiece optical system, a light emitting device which is disposed behind said beam splitter as viewed from said eyepiece optical system side, and a mask member disposed on said light emitting device.

8. A camera according to claim 7, further comprises a distance measuring means for measuring the distance of the object, and said bright area indicates the distance measuring zone.

9. A camera according to claim 8, wherein said control means controls said indicating means so as to blink said bright area when said distance measuring means detects that the object is too close to the camera for photographing.

10. A camera according to claim 7, wherein said beam splitter is composed of a half mirror.

11. A view finder in which an image formed by an objective optical system is observed through an eyepiece optical system comprising:
- a beam splitter for deflecting a light path from said objective optical system toward said eyepiece optical system, said beam splitter being located behind an image forming position of said objective optical system;
- a light emitting means which defines a bright indicating area in a field of view of said view finder when said light emitting means emits light, which is disposed behind said beam splitter as viewed from said eyepiece optical system side; and
- a photometering means for measuring the brightness of the object, which is disposed behind said beam splitter as viewed from said objective optical system side.

12. A view finder according to claim 11, wherein said light emitting means comprises a light emitting device and a mask member disposed on said light emitting device.

13. A view finder according to claim 12, wherein said mask member has a window to restrict a range of said bright indicating area.

14. A view finder according to claim 13, wherein the thickness of said mask member is designed in accordance with an image forming range in which the image of an object is formed by said objective optical system.

15. A view finder according to claim 11, further comprising a light emitting control circuit for controlling an emission of the light emitting means, which inhibits said emission while photometering by said photometering means.

* * * * *